United States Patent [19]

Matsuda et al.

[11] Patent Number: 5,281,893
[45] Date of Patent: Jan. 25, 1994

[54] DISPLAY DEVICE WITH AN ANTI-REFLECTION FILM ON THE DISPLAY PLANE

[75] Inventors: Hidemi Matsuda, Oomiya; Takeo Itou, Kumagaya; Kazuhiko Shimizu, Fukaya, all of Japan

[73] Assignee: Kabushiki Kaisha Toshiba, Kawasaki, Japan

[21] Appl. No.: 733,806

[22] Filed: Jul. 22, 1991

[30] Foreign Application Priority Data

Jul. 24, 1990 [JP] Japan .................. 2-195896

[51] Int. Cl.⁵ ........................... H01J 29/88
[52] U.S. Cl. ..................... 313/478; 313/479; 359/609; 345/87; 348/834
[58] Field of Search ............ 313/478, 479, 477 R; 358/252; 359/581, 589, 609; 340/784

[56] References Cited

U.S. PATENT DOCUMENTS 4,723,091  2/1988  Kawamura et al. .............. 313/478

FOREIGN PATENT DOCUMENTS 58-172243  10/1983  Japan .
58-211701  12/1983  Japan .
029051    7/1984   Japan .
61-10043   1/1986   Japan .
1-41149    2/1989   Japan .
0286240   11/1989   Japan ................. 313/477 R
2-115801   7/1990   Japan .

OTHER PUBLICATIONS

Sanchez et al, "Chemical Modification of Alkoxide Precursors", Journal of Non-Crystalline Solids, 1988, pp. 65.

Primary Examiner—Donald J. Yusko
Assistant Examiner—Ashok Patel
Attorney, Agent, or Firm—Cushman, Darby & Cushman

[57] ABSTRACT

A display device including a display screen having an optical film provided thereon. The optical film is a porous thin film made of fine magnesium fluoride particles and a binder containing a condensate of a silane compound having a fluoroalkyl group, a co-condensate of the silane compound and silicon, or a co-condensate of the silane compound and a metal oxide compound. The combination of the specific binder and fine magnesium fluoride particles permits forming a porous optical film having a surprisingly high mechanical strength, excellent resistance to humidity and reduced external light reflection from the display plane.

14 Claims, 7 Drawing Sheets

DISPLAY DEVICE WITH AN ANTI-REFLECTION FILM ON THE DISPLAY PLANE

BACKGROUND OF THE INVENTION

1. Field of the Invention

The present invention relates to a display device for a cathode ray tube or for a liquid crystal display device including an anti-reflection film formed on the display plane.

2. Description of the Related Art

In general, the display screen of a cathode ray tube or a liquid crystal display device comprises a smooth glass substrate forming the outer surface of the display screen. As a result, a primary reflection of the external light takes place on the outer surface so as to obscure the picture image displayed on the display screen.

Figure 1:
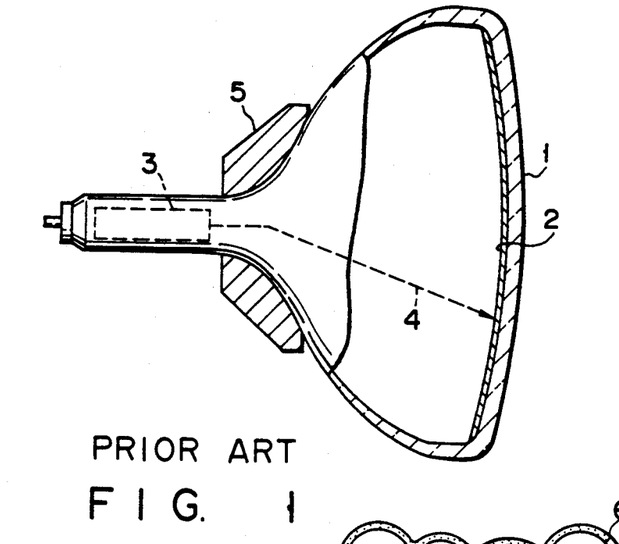
FIG. 1 schematically shows the construction of a conventional color cathode ray tube.

A cathode ray tube is constructed as shown in, for example, FIG. 1. It is seen that a phosphor screen 2 positioned within a vacuum envelope is formed inside a faceplate 1 made of a smooth glass plate. Also disposed within the vacuum envelope are an electron gun 3, which emits an electron beam 4, and a deflection yoke 5 serving to magnetically deflect the electron beam 4 so as to scan the electron beam in the horizontal and vertical directions on the phosphor screen 2. A picture image is displayed on the phosphor screen as a result of the horizontal and vertical scanning of the electron beam noted above. What should be noted is that the outer surface of the faceplate is made of a smooth glass, with the result that a primary reflection of an external light taking place on the outer surface of the faceplate 1 overlaps with the picture image displayed on the phosphor screen. Naturally, the overlapping noted above obstructs a clear viewing of the picture image displayed on the phosphor screen.

A means for overcoming the above-noted difficulty is proposed in, for example, Published Unexamined Japanese Patent Application No. 61-29051. It is proposed that fine concavities are formed on the outer surface of the faceplate so as to scatter the external light. In this method, however, the entire screen is rendered whitish, with the result that the contrast is seemingly deteriorated. Also, resolution of the picture image is deteriorated.

It is also known to the art that an optical film of a single layer structure or a multilayer structure is formed on the outer surface of the faceplate so as to prevent the reflection of the external light. This technique certainly permits effectively preventing the primary reflection an external light so as to prevent deterioration in contrast and resolution.

Where the optical film noted above is of a single layer structure, the optical film is formed of a material having a refractive index smaller than that of the glass forming the ordinary faceplate. It should be noted that the condition for eliminating reflection in this case is represented by: $n_1^2 = n_0 \cdot n_2^2$, where $n_1$ denotes the refractive index of the film, $n_0$ denotes the refractive index of the air, and $n_2$ is the refractive index of the substrate in the display section.

In the case of a cathode ray tube, the substrate in the display section is formed of glass, i.e., $n_2^2 = 1.52$. On the other hand, the refractive index of the air is: $n_0 = 1.00$. It follows that the refractive index of the optical film is: $n_1 = 1.23$.

In general, the optical film of the single layer structure is formed by means of vacuum vapor deposition of magnesium fluoride ($MgF_2$). However, magnesium fluoride itself has a refractive index of 1.38, which is greater than 1.23 given above. It follows that the optical film formed by means of the vacuum vapor deposition fails to produce a sufficient effect of preventing the external light reflection. It is also known to the art to use fine magnesium fluoride particles for forming an optical film of a single layer structure. In this case, the magnesium fluoride particles are bonded to each other by silicon dioxide obtained by hydrolyzing and dehydrating-condensing for example, a silicon alkoxide.

Figure 2:
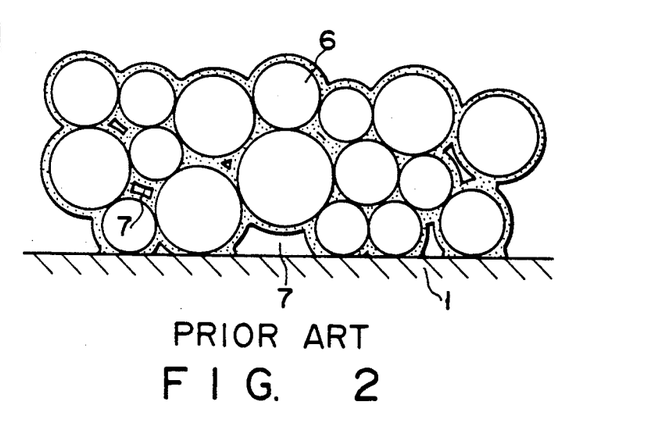
FIG. 2 schematically shows the construction of a conventional optical film serving to prevent an external light reflection.
Figure 3:
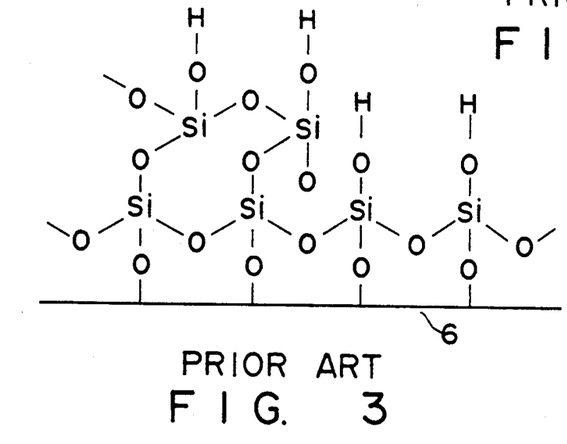
FIG. 3 shows the chemical structure covering the surface region of a conventional optical film.

FIG. 2 schematically shows an optical film utilizing fine magnesium fluoride particles. As apparent from the drawing, the film is porous such that clearances 7 are formed between adjacent fine particles 6 of magnesium fluoride. It is possible to prepare a porous optical film having a refractive index smaller than 1.38, i.e., smaller than the refractive index of magnesium fluoride itself. For forming a porous magnesium fluoride film having a sufficiently high mechanical strength, however, it is necessary to use a large amount of a binder relative to the amount of magnesium fluoride, with the result that the refractive index of the porous film is increased so as to suppress the effect of preventing light reflection. What should also be considered is the surface structure of the optical film. Specifically, FIG. 3 schematically shows the surface structure noted above. As seen from the drawing, silicon dioxide and uncondensed Si—O—H structure are present on the surface of the fine magnesium fluoride particle 6. The optical film of this surface structure readily adsorbs water. The adsorbed water permeats into the clearance within the porous film so as to bring about a change in the refractive index. In other words, the refractive index of the porous film is changed with time in accordance with increase in the amount of water adsorbed by the film.

Where the optical film is of a two layer structure, the condition for eliminating an external light reflection can be represented by: $n_2 \cdot n_4^2 = n_0 \cdot n_3^2$, where $n_2$ denotes the refractive index of the glass substrate in the display section, $n_3$ denotes the refractive index of the lower of the film, $n_4$ denotes the refractive index of the upper layer of the film, and $n_0$ denotes the refractive index of the air. Where $n_2 = 1.52$ and $n_0 = 1.00$, the ratio $n_3/n_4$ is 1.23. It follows that is possible to prepare to desired optical film of a multilayer structure by suitably selecting the materials of the lower and upper layers of the film such that the refractive index ratio $n_3/n_4$ is 1.23. In practice, an optical film having a desired refractive index can be readily prepared by using a material having a relatively large refractive index for forming the lower layer.

An optical film of a two layer structure, which permits eliminating an external light reflection, is disclosed in, for example, Published Unexamined Japanese Patent Application No. 61-10043. It is taught that the lower layer is formed of an oxide-series compound of titanium or zirconium, e.g., a co-condensate between an alkoxide of titanium or zirconium and a silicon dioxide series compound such as a silicon alkoxide. On the other hand, the upper layer is formed of a fluorine-containing silicone compound which can be obtained from an alkoxy silane or chlorosilane having a polyfluoroalkyl group. In the optical film of this type, however, the lower layer has a high refractive index. If some portion of the lower layer is not covered with the upper layer because of, for example, an uneven coating of the upper layer, a surface reflection takes place in the optical film in the portion where the lower layer is not covered with the upper layer, leading to a high reflectance. Suppose the lower layer has a refractive index of, for example, 1.7, the lower layer exhibits a reflectance of 10%, which is more than twice the reflectance 4.3% of the substrate formed of the ordinary glass. It follows that only a slight defect of the laminate structure attracts attentions. Naturally, the optical film of a two layer structure is lower in yield than the film of a single layer structure. Also, the film of a two layer structure requires a complex manufacturing process, leading to a high manufacturing cost, compared with the film of a single layer structure.

As described above, the conventional optical film for preventing an external light reflection in a display device leaves room for further improvements in reflectance, mechanical strength, humidity resistance and menufacturing cost.

SUMMARY OF THE INVENTION

An object of the present invention is to provide a display device provided with an optical film of a single layer structure which permits sufficiently eliminating an external light reflection, has a sufficiently high mechanical strength, and is low in deterioration with time.

According to the present invention, there is provided a display device comprising a thin optical film formed on the display screen, said optical film being porous, serving to prevent an external light reflection, and being formed of fine magnesium fluoride particles and a binder containing as a main component at least one condensate selected from the group consisting of a condensate of a silane compound having a fluoroalkyl group and a co-condensate between said silane compound and silicon or a metal oxide series compound.

In the present invention, the binder contained in the optical film has a refractive index substantially equal to that of magnesium fluoride ($MgF_2$). It is possible to control the porosity of the thin optical film by controlling the amount of the binder relative to the amount of the magnesium fluoride particles so as to enable the optical film to prevent sufficiently the external light reflection. The binder used in the present invention exhibits a bonding strength substantially equal to that of silicon dioxide used in the conventional optical film of a single layer structure, i.e., silicon dioxide prepared by hydrolyzing a silicon alkoxide, followed by applying a dehydrating-condensing reaction. Naturally, the binder used in the present invention permits imparting a desired mechanical strength to the thin optical film. It should be noted that the fine magnesium fluoride particles are bonded to each other via a silicon matrix in which the bonding is achieved by a siloxane bond having a hydrophobic fluoroalkyl group. What should also be noted is that the fluoroalkyl group noted above serves to prevent water from entering the clearances (or pores) of the porous thin optical film, with the result that the optical film is not deteriorated with time. Further, the optical film is of a single layer structure in the present invention, making it possible to prepare the optical film easily and at a low cost.

To reiterate, a silicone resin having a fluoroalkyl group and fine magnesium fluoride particles are used in combination in the present invention so as to prepare a porous, thin optical film having a sufficiently high mechanical strength and an excellent resistance to humidity an effect of preventing an external light reflection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6C shows a model of structural formula representing an example of the surface state of an optical film according to the present invention.

FIG. 6D shows a model of structural formula representing an example of the surface state of an optical film according to the present invention.

DETAILED DESCRIPTION OF THE PREFERRED EMBODIMENTS

Figure 4:
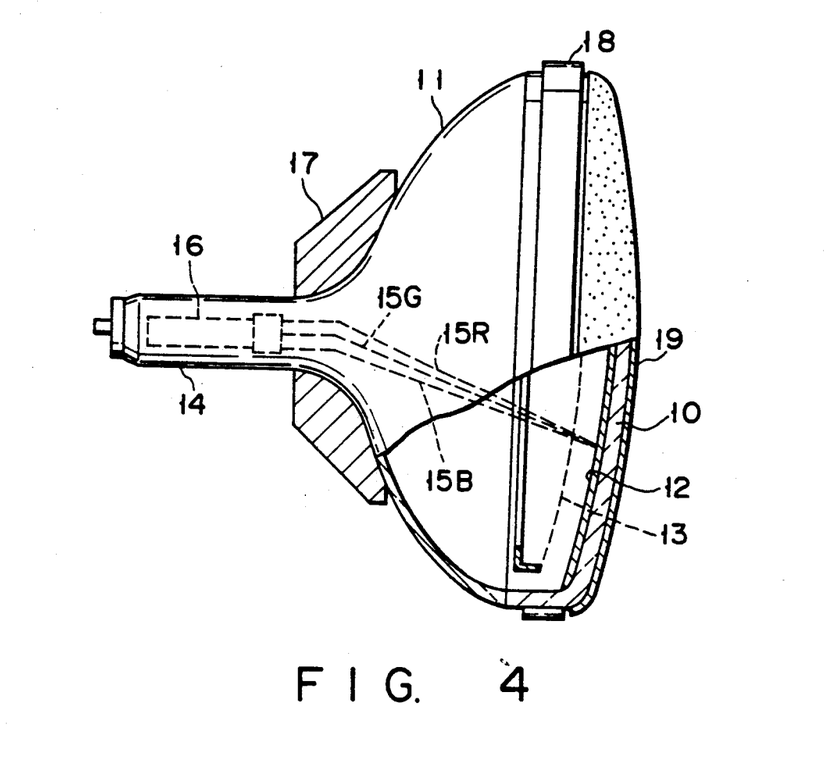
FIG. 4 schematically shows the construction of a color cathode ray tube according to one embodiment of the present invention.

FIG. 4 schematically shows a color cathode ray tube according to one embodiment of the present invention. As shown in the drawing, the color cathode ray tube comprises a vacuum envelope provided with a glass panel 10 having a smooth spherical outer surface and a funnel 11 integrally bonded to the panel 10. The panel 10 acts as a substrate of the display plane. Formed on the inner surface of the panel 10 is a phosphor screen 12 consisting of dot-like or striped phosphor layers of blue, green, red emission and a light absorbing layer filling the clearances between the three phosphor layers. Further, a shadow mask 13 having a large number of apartures through which electron beams run is disposed inside the phosphor screen 12 in a manner to face the phosphor screen 12. An electron gun 16 serving to emit three electron beams 15B, 15G, 15R is arranged in a neck 14 of the funnel 11. The three electron beams 15B, 15G, 15R, emitted from the electron gun 16 are deflected by the magnetic field generated from a defection yoke 19 so as to permit these electron beams to scan in the vertical and horizontal directions over the phosphor screen 12. As a result, a picture image is displayed on the display plane. An explosion-proof band 18 is wound about the outer surface of the panel 10 so as to protect the vacuum envelope from implosion. Further, an optical film 19 serving to prevent the primary reflection of an external light is formed to cover the outer surface of the panel 10 and to partly cover the side wall of the vacuum envelope around the panel.

Figure 5:
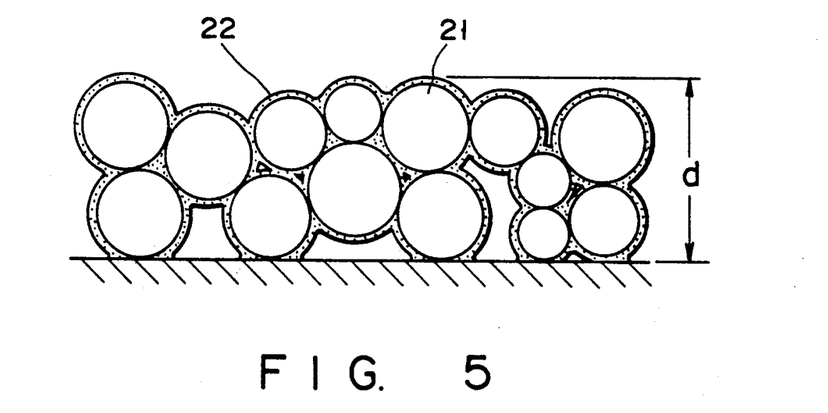
FIG. 5 shows the general construction of an optical film used in the present invention.

FIG. 5 shows a model of the optical film 19 used in the present invention. To be more specific, the optical film 19 consists of a porous thin film prepared by bonding fine magnesium fluoride particles 21 with a binder 22. Condensates of a silane compound having a fluoroalkyl group represented by the chemical structures (I) and (II) given below can be used as a binder in the present invention:

$$[R_f(CH_2)_2]_n R_m Si (OR')_{4-(n-m)} \quad (I)$$

and $$(OR')_3 Si (CH_2)_2 R_f (CH_2)_2 Si(OR')_3 \quad (II)$$

where, $R_f$ is a fluoroalkyl group, R is an alkyl group or a phenyl group, R' is an alkyl group or a phenyl group, n is a natural number of 3 or less, m is any one of 1, and 2, and (n+m) is not greater than 3.

The alkoxy group (OR') included in the chemical formula given above may be replaced by chlorine. It is also possible to use as a binder a co-condensate between a silane compound having a fluoroalkyl group noted above and a metal oxide series compound represented by, for example, $M(OR)_N$ where M is a metal such as titannium or zirconium.

A co-condensate of the silane compound and silicone, and a co-condensate of the silane compound and a metal oxide are represented as follows:

$$[R_f(CH_2)_2]_n R_m [SiO_{\{4-(n+m)\}/2}] \cdot (MO_{N/2}) \quad (V);$$

and $$[O_{3/2}Si(CH_2)_2 R_f(CH_2)_2 SiO_{3/2}] \cdot (MO_{N/2}) \quad (VI)$$

where M is selected from silicon and metal and N denotes the valency of M.

Figure 6A:
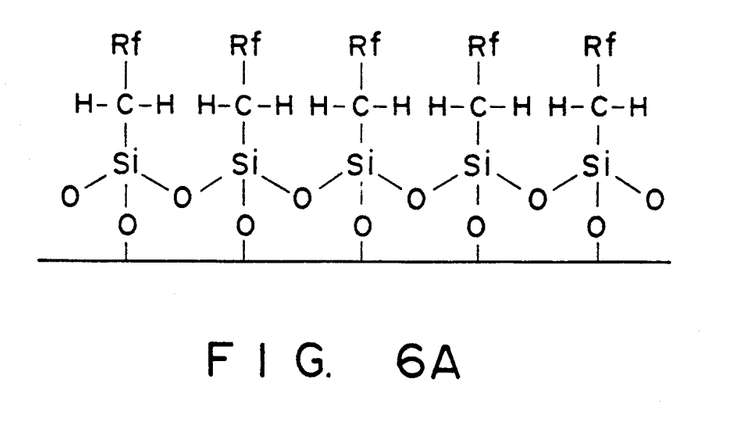
FIG. 6A shows a model of a structural formula representing as an example the surface state of an optical film used in the present invention.
Figure 6B:
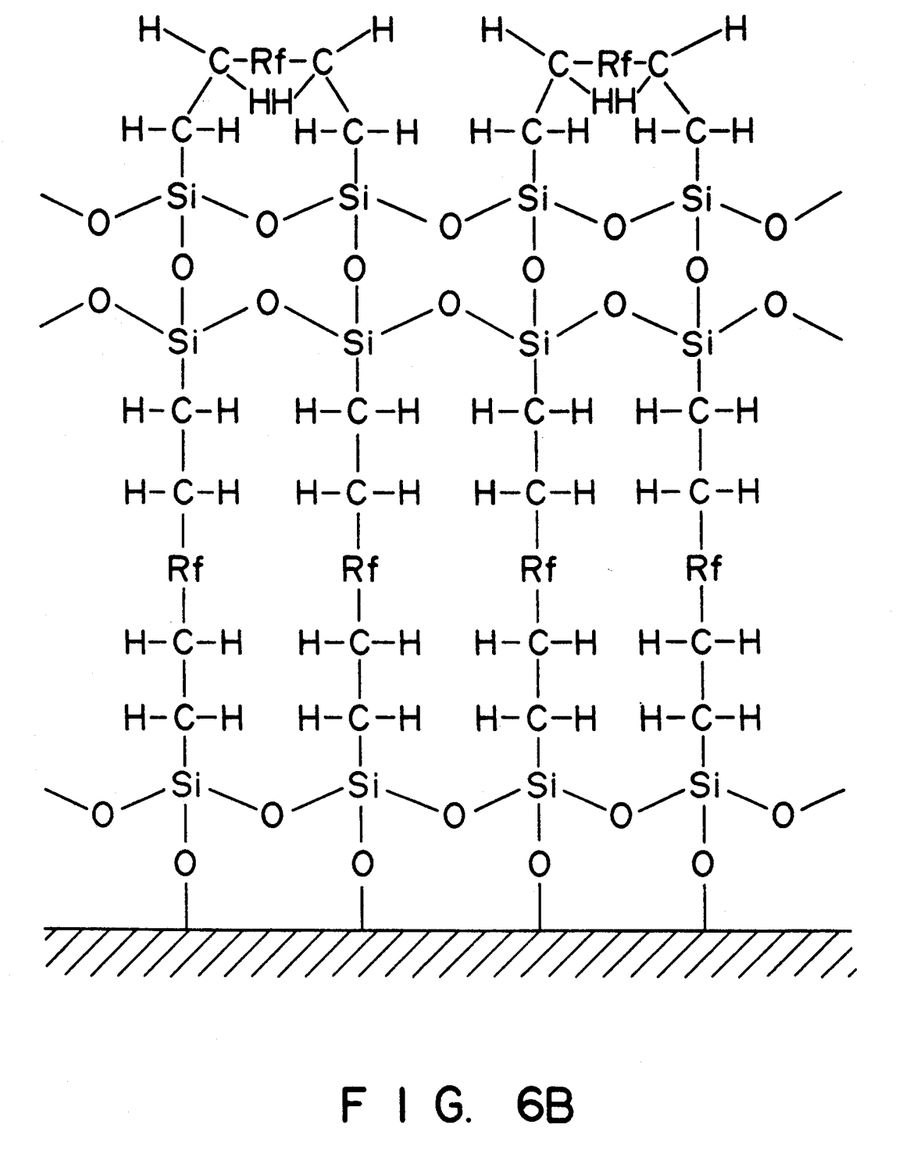
FIG. 6B shows a model of a structural formula representing as another example the surface state of an optical film used in the present invention.

FIG. 6A shows a model of a structural formula representing as an example the surface state of an optical film using as a binder a condensate having a fluoroalkyl group represented by chemical formula (I) given above. On the other hand, FIG. 6B shows a model of a structural formula representing as another example the surface state of an optical film using as a binder a condensate having a fluoroalkyl group represented by chemical formula (II) given above.

FIG. 6C shows a model of structural formula representing an example of the surface state of an optical film using as a binder containing materials represented by the formula (V). FIG. 6D shows a model of structural formula representing an example of the surface state of an optical film using as a binder containing materials represented by the formula (VI).

It should be noted that the thickness d of the optical film 19 is determined by: $n_1.d = \lambda/4$, where n denotes the refractive index of the film 19 and $\lambda$ represents the wavelength of the light. In the embodiment described above, the value of $\lambda$ is set at 550 μm in which spectral luminous efficacy is best and the optical film 19 is formed in a thickness d of 1000Å. Naturally, the diameter of the fine magnesium fluoride particle 21 is smaller than 1000Å. However, if the diameter is smaller than 10Å, the magnesium fluoride particles are agglomerated within a coating solution used for forming the optical film so as to form large secondary particles, resulting in failure to form a homogeneous optical film 19. In other words, it is desirable for the magnesium fluoride particles to have a diameter of at least 10Å.

The silane compounds having a fluoroalkyl group, which can be used for forming the optical film 19, include for example:

$CF_3(CF_2)_5(CH_2)_2Si(OR)_3$;

$CF_3(CF_2)_5(CH_2)_2Si(OR)_2$
$\quad | $
$\quad CH_3$ $CF_3(CH_2)_2Si(OR)_3$;
$(OR)_3Si(CH_2)_2(CF_2)_5(CH_2)_2Si(OR)_3$;
$CF_3(CF_2)_7(CH_2)_2Si(OR)_3$;
$CF_3(CH_2)_2SiCl_3$;
$Cl_3Si(CH_2)_2(CF_2)_5(CH_2)_2SiCl_3$;
$CF_3(CF_2)_7(CH_2)_2SiCl_3$;
$CF_3(CF_2)_7(CH_2)_2Si(CH_3)(OR)_2$;
$CF_3(CF_2)_5(CH_2)_2SiCl^3$;
$CF_3(CH_2)_2Si(OR)_2$
$\quad | $
$\quad CH_3$ $CF_3(CH_2)_2SiCl_2$; and
$\quad | $
$\quad CH_3$ $CF_3(CF_2)_7(CH_2)_2Si(CH_3)Cl_2$; and In the above formulas R denote alkyl group or phenyl group.

Where the optical film 19 is provided by a porous film consisting of fine magnesium fluoride particles 21 and a binder 22 consisting of a condensate of a silane compound having a fluoroalkyl group noted above, in which the alkoxy group may or may not be replaced by chlorine, or a co-condensate between a silane compound having a fluoroalkyl group and silicon or a metal oxide series compound, the binder has a refractive index of 1.35 to 1.43, which is substantially equal to the refractive index (1.38) of magnesium fluoride. Naturally, the refractive index of the optical film 19 is not significantly changed, even if the mixing ratio of the binder to the magnesium fluoride particles, i.e., binder/MgF$_2$, is changed. It follows that the refractive index of the optical film 19 depends mainly on the porosity of the film.

Figure 7:
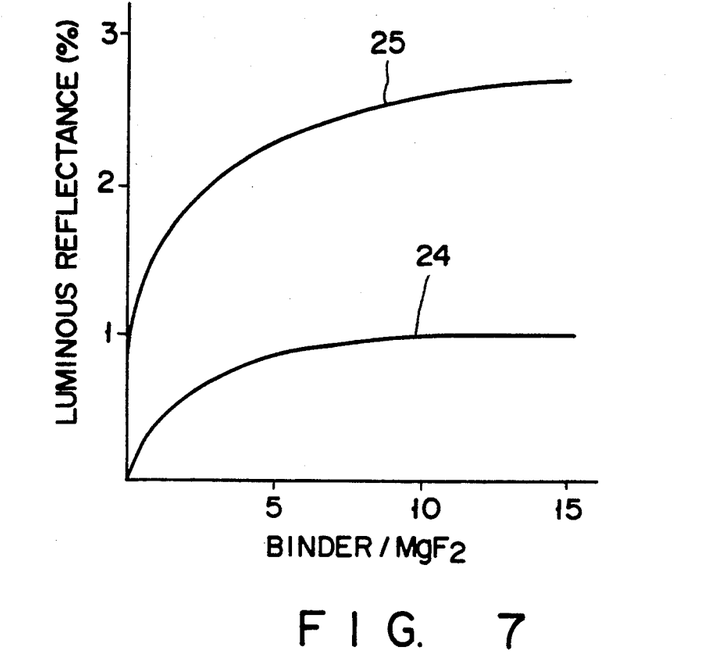
FIG. 7 is a graph showing the relationship between the luminous reflectance and the ratio of the binder to the magnesium fluoride particles (binder/$MgF_2$) used in the optical film employed in the present invention.
Figure 8:
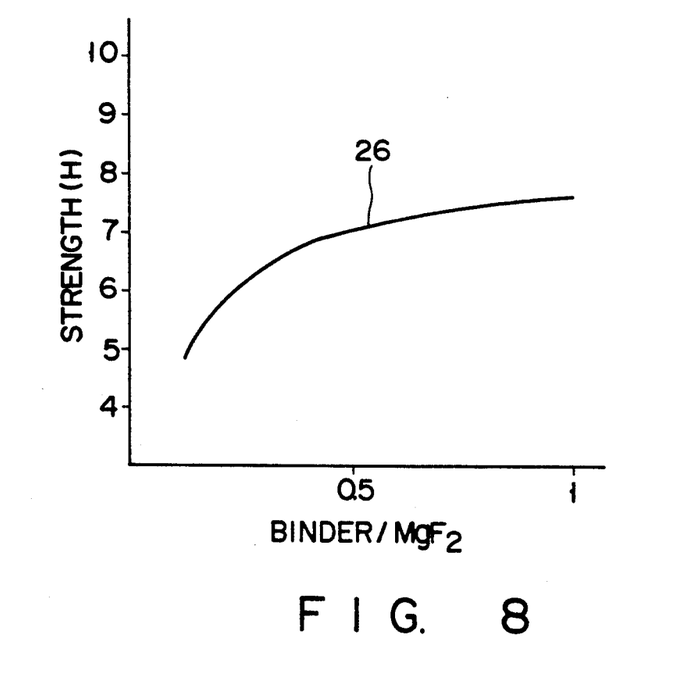
FIG. 8 is a graph showing the relationship between the mechanical strength of the optical film and the binder/$MgF_2$ ratio.
Figure 9:
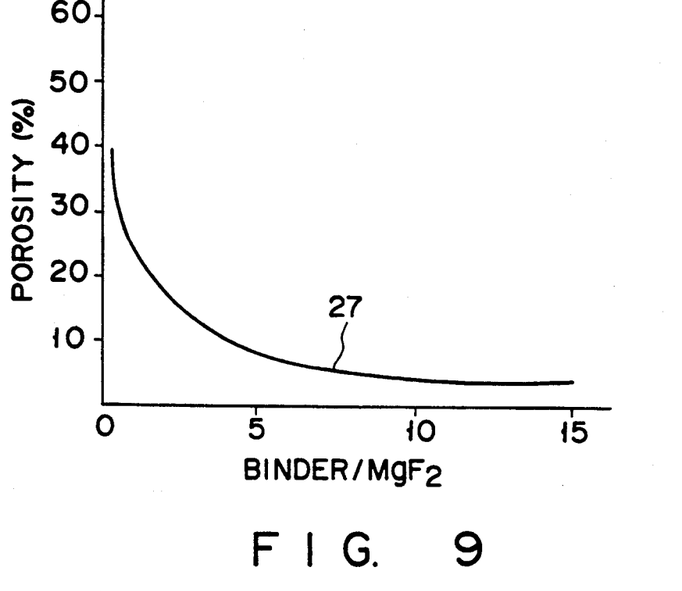
FIG. 9 is a graph showing the relationship between the porosity of the optical film and the binder/$MgF_2$ ratio.
Figure 10:
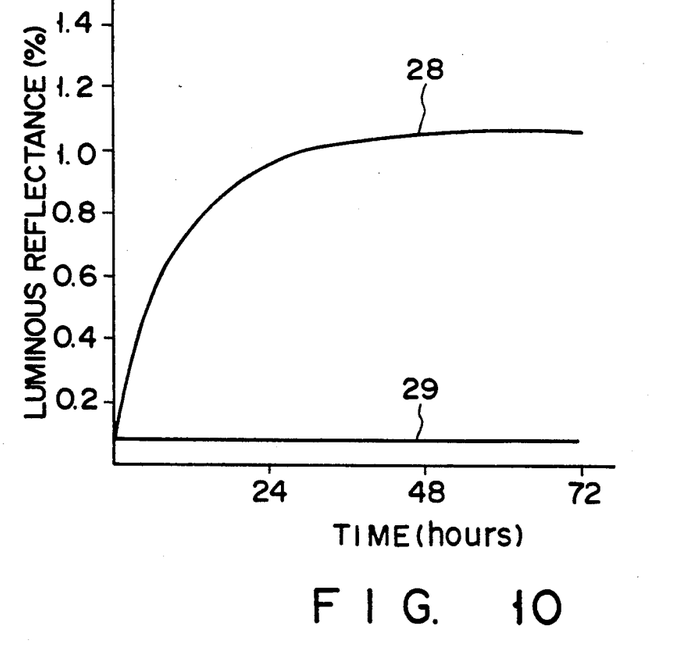
FIG. 10 shows a change with time in the luminous reflectance of the optical film.

FIGS. 7 to 9 are graphs reporting experimental data showing the relationship of reflactance, strength and porosity of the optical filter, and the binder/MgF$_2$ ratio, respectively. Further, FIG. 10 is a graph reporting experimental data showing a change with time in the luminous reflectance. To be more specific, FIG. 7 includes curve 24 showing the relationship between the amount of a binder relative to the amount of magnesium fluoride particles, said binder consisting of a condensate of a silane compound having a fluoroalkyl group, and the luminous reflectance of the optical film prepared by using said binder. FIG. 7 also includes curve 25 denoting a control case. In the control case, silicon dioxide prepared by hydrolyzing a silicon alkoxide, followed by applying a hydrating-condensing reaction, is used as a binder. Also, the data on the luminous reflectance in the control case are those under a stabilized condition reasonable time after the change in the initial stage. In order to enable the film to prevent completely the external light reflection, it is preferable for the reflectance to be set at 1.0% or less. It follows that the amount of the binder should be at most 11 times as much as the amount of the magnesium fluoride particles, as seen from curve 24 of FIG. 7. On the other hand, curve 25 of FIG. 7 indicates that the amount of the silicon dioxide binder should be at most 0.25 time a much as the amount of the magnesium fluoride particles. In conclusion, the experimental data given in FIG. 7 support that the binder defined in the present invention can be used in a broader range of the amount and can be used in a larger amount, compared with the binder used in the conventional optical film for preventing an external light reflection.

FIG. 8 includes curve 26 showing the relationship between the amount of a binder relative to the amount of magnesium fluoride particles, said binder consisting of a condensate of a silane compound having a fluoroalkyl group, and the mechanical strength of the optical film prepared by using said binder. Concerning the mechanical strength of the optical film, the conventional optical film using a binder of the particular silicon dioxide noted previously is substantially equal to the optical film used in the present invention, though the data on the conventional optical film are not shown in FIG. 8. It is practically nesessary for the optical film formed on the surface of the vacuum envelope of a cathode ray tube to have a pencil hardness of at least 6H. In other words, FIG. 8 shows that, in order to form an optical film having a desired mechanical strength, it is preferable to use a binder in an amount at least 0.25 time as much as that of the magnesium fluoride particles.

As apparent from the experimental data given in FIGS. 7 and 8, it is preferable to set the amount of the binder to fall within a range of between 0.25 and 11 times as much as the amount of the fine magnesium fluoride particles in order to form an optical film of a preferred reflectance and a desired mechanical strength by using fine magnesium fluoride particles and a binder consisting of a condensate of a silane compound having a fluoroalkyl group. To be more specific, where it is intended to prepare an optical film having a reflectance of at most 0.88 and a mechanical strength of at least 7H in pencil hardness, it is necessary to use a binder in an amount falling within a range of between 0.5 and 11 times as much as the amount of the fine magnesium fluoride particles. On the other hand, it is impossible to enable the prepared optical film to meet the requirements of both the reflectance and the mechanical strength in the case of the conventional optical film using the particular silicon dioxide as a binder. Naturally, the optical film used in the present invention essentially differs from the conventional optical film using silicon dioxide as a binder.

The porosity is the greatest factor involved in the reduction in the refractive index of the optical film. FIG. 9 is a graph showing the relationship between the porosity of the optical film and the amount of a binder relative to the amount of the fine magnesium fluoride particles, said binder consisting of a condensate of a silane compound having a fluoroalkyl group. As described previously, it is necessary to use a binder in an amount falling within a range of between 0.25 and 11, preferably between 0.5 and 11, times as much as the amount of the fine magnesium fluoride particles in order to form an optical film exhibiting a desired reflectance and a desired mechanical strength. It follows that the desirable porosity of the optical film should fall within a range of between 4.5 and 36%, more desirably between 8 and 27%, as apparent from curve 27 shown in FIG. 9.

FIG. 10 is a graph showing a change with time in the luminous reflectance at a temperature of 25° C. and a relative humidity of 90% with respect to an optical film used in the present invention (curve 29) and a conventional optical film using the particular silicon dioxide described previously as a binder (curve 28). In this experiment, a binder consisting of a condensate of a silane compound having a fluoroalkyl group was used in an amount of 0.25% by weight based on the amount of the fine magnesium fluoride particles in the case of the present invention (curve 29). As apparent from FIG. 10, the optical film used in the present invention is free from a change with time in the luminous reflectance. On the other hand, the luminous reflectance is greatly changed with time in the case of the conventional optical film using silicon dioxide as a binder.

In the optical film of the present invention exemplified above, the magnesium fluoride particles are bonded to each other by a silicon matrix containing a siloxane bond having a fluoroalkyl group. It is considered reasonable to understand that the strong hydrophobic property of the fluoroalkyl group serves to prevent water from entering the pores of the porous thin film.

As described previously, the porous optical film used in the present invention contains a binder consisting of a condensate of a silane compound having a fluoroalkyl group or a co-condensate between the particular silane compound and silicon or a metal oxide series compound. What should be noted is that the particular binder used in the present invention is substantially equal to magnesium fluoride in refractive index, making it possible to determine the amount of the binder relative to the amount of the magnesium fluoride particles in view of the desired porosity of the thin optical film. It follows that it is possible to prepare a thin optical film capable of sufficiently preventing an external light reflection. What should also be noted is that the binder used in the present invention is substantially equal in its bonding strength to silicon dioxide used as binder in the conventional optical film of a single layer structure, i.e., silicon dioxide prepared by hydrolyzing a silicon alkoxide, followed by applying a dehydrating-condensing reaction. Thus, it is possible to maintain the mechanical strength of the optical film at a desired level in the present invention. In addition, the magnesium fluoride particles are bonded to each other in the present invention by a silicon matrix containing a siloxane bond having a hydrophobic fluoroalkyl group. It follows that the fluoroalkyl group serves to prevent water from entering the pores of the porous thin optical film, making it possible to prevent the luminous reflectance of the optical film from being changed with time.

EXAMPLE 1:

Four kinds of solution A to D shown in Table 1 were prepared in the first step. Each of these solutions was subjected to aging for several hours while stirring the solution so as to carry out a hydrolyzing reaction and a dehydrating-condensing reaction to some extent. The outer surface of the panel used for a 25-inch color cathode ray tube was coated with the resultant solution by a spin coating method while rotating times of the panel is controlled so as to form a film having a thickness of 1000Å. The coated film was baked at 200° C. for 20 minutes so as to form an optical film serving to prevent an external light reflection.

TABLE 1

| Composition | | A | B | C | D |
|---|---|---|---|---|---|
| $CF_3(CF_2)_5(CH_2)_2 Si(OCH_3)_3$ | (wt %) | 0.5 | 1.5 | 2.6 | 2.8 |
| Pure water | (wt %) | 0.4 | 0.4 | 0.4 | 0.4 |
| HCl | (wt %) | 0.1 | 0.1 | 0.1 | 0.1 |
| Fine $MgF_2$ particles (average particle diameter: 600 Å) | (wt %) | 2.5 | 1.5 | 0.4 | 0.2 |
| Ethyl alcohol | (wt %) | | balance | | |
| Visual reflectance (%) | | 0.06 | 0.38 | 0.9 | 1.05 |
| Film hardness (H) | | 5 | 7 | 8 | 8 |

As shown in Table 1, the optical film thus formed exhibited a reflectance of 0.06 to 1.05, and a film hardness of 5H to 8H in pencil hardness. In addition, the resultant optical film was found to be substantially free from a change with time in the luminous reflectance.

An additional experiments were conducted substantially as above, except that the compounds given below were used as a binder in place of $CF_3(CF_2)_5(CH_2)_2Si(OCH_3)_3$ shown in Table 1:

$(CH_3O)_3Si(CH_2)_2(CF_2)_5(CH_2)_2Si(OCH_3)_3$ (IV)

Substantially the same results as shown in Table 1 were obtained in these additional experiments.

EXAMPLE 2:

Three kinds of solutions E to G as shown in Table 2 were prepared. As seen from Table 2, a co-condensate between a silane compound having a fluoroalkyl group and a silicon alkoxide was used as a binder in Example 2. As in Example 1, each of these solutions was subjected to aging for several hours while stirring the solution so as to carry out a hydrolyzing reaction and a dehydrating-condensing reaction to some extent. Then, the outer surface of the panel for a 25-inch color cathode ray tube was coated with the resultant solution by a spin coating method while rotating times of the panel so as to form a film having a thickness of 1000Å. The coated film was baked at 200° C. for 20 minutes so as to form an optical film serving to prevent an external light reflection.

TABLE 2

| Composition | | E | F | G |
|---|---|---|---|---|
| $CF_3(CF_2)_5(CH_2)_2 Si(OCH_3)_3$ | (wt %) | 1.4 | 1.0 | 0.75 |
| $Si(OC_2H_5)_4$ | (wt %) | 0.1 | 0.5 | 0.75 |
| Pure water | (wt %) | 0.4 | 0.4 | 0.4 |
| HCl | (wt %) | 0.1 | 0.1 | 0.1 |
| Fiene $MgF_2$ particles (average particle diameter: 600 Å) | (wt %) | 1.15 | 1.5 | 0.4 |
| Ethyl alcohol | (wt %) | | balance | |
| Visual reflectance (%) | | 0.38 | 0.40 | 0.42 |
| Film hardness (H) | | 7 | 7 | 7 |

As shown in Table 2, the optical film thus formed exhibited a reflectance of about 0.4% in each of sample E, F, and G. Also, the resultant optical film was found to be substantially free from a change with time in the luminous reflectance. On the other hand, the mechanical strength of the optical film was also found to be satisfactory, i.e., 7H in pencil hardness. In conclusion, the optical film in Example 2 was satisfactory in each of the luminous reflectance and mechanical strength with respect to all the sample E, F and G.

It is particularly important to note that the occurrence of such a defect as to make the optical film unsuitable for a practical use in each of Examples 1 and 2 was markedly lower than in the conventional optical film of a two layer structure. To be more specific, the optical film of the present invention, even if formed in a clean room having a cleanness of 5000 class, were found to be substantially equal in the defect occurrence rate to the conventional optical film of a two layer structure formed in a clean room having a clanness of 1000 class. It follows that the optical film used in the present invention, which is adapted for a practical use, can be formed easily on a mass production basis.

In Example 2, a co-condensate between a silane compound having a fluoroalkyl group and a silicon alkoxide was used as a binder. However, it is also possible to use as a binder a co-condensate between the particular silane compound and an alkoxide of a metal such as titanium or zirconium. Further, it is possible for the optical film to contain a dye or pigment serving to impart a selective light absorbing function to the optical film. The dyes used in the present invention include, for example, acid rhodamine B and rhodamine B. On the other hand, the pigment used in the present invention include, for example, host palm pink mixture of cobalt (II) aluminate and cadmium red and pigment obtained by laking such dyes. Further, it is possible for the optical film to contain fine particles of, for example, indium oxide or tin oxide so as to impart an electrical conductivity to the optical film. In this case, it is possible to prevent the optical film from being electrically charged, making it possible to prevent dust from being attached to the optical film and to prevent an electrical shock given to the human body.

Figure 11:
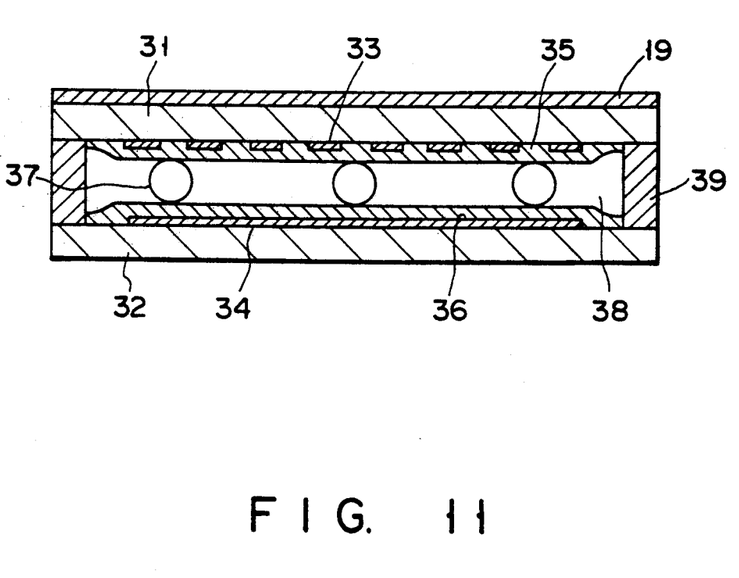
FIG. 11 schematically shows the construction of a liquid crystal display device according to another embodiment of the present invention.

FIG. 11 shows a liquid crystal display device according to another embodiment of the present invention. As seen from the drawing, the liquid crystal display device comprises a pair of mutually facing glass substrates 31, 32, electrode 33, 34 of predetermined patterns formed on the mutually facing inner surfaces of the glass substrates 31, 32, respectively, orientation film 35, 36 formed on the mutually facing inner surfaces of the glass substrates 31, 32, in a manner to cover the electrodes 33, 34, respectively, and spacers 37 arranged between the glass substrates 31 and 32 and fixed to the orientation films 35, 36. Each of the electrodes 33 and 34 is made of indium oxide tin oxide (ITO). Also, the spacer 37 is formed of a thermosetting resin and determined the clearance between the glass substrates 31 and 32. The liquid crystal display device also comprises a liquid crystal material 38 filling the clearance, and a sealant 39 serving to seal the peripheral portion of the glass substrates 31, 32 having the liquid crystal material 38 loaded therein. It should be noted that the optical film 19 serving to prevent an external light reflection is formed to cover the outer surface of one of the glass substrates, i.e., the glass substrate 31 acting as the substrate of a display section of the liquid crystal display device.

The optical film 19 was formed as follows. Specifically, the outer surface of the liquid crystal display device constructed as described above was sealed except for the outer surface of the electrode 31. Under this condition, the display device was dipped in the solution B shown in Table 1, followed by pulling up the display device at a controlled pulling rate so as to form a coating film having a thickness of 1000Å on the surface of the electrode 31. Finally, the coating film was baked with a hot air of about 60° C. for 40 minutes so as to form the optical film 19, as desired. The optical film 19 formed on the outer surface of the electrode 31 was found to exhibit a luminous reflectance of about 0.4% and a mechanical strength of 7H in pencil hardness. Further, the optical film 19 was found to be free from a change with time in the luminous reflectance.

Additional advantages and modifications will readily occur to those skilled in the art. Therefore, the invention in its broader aspects is not limited to the specific details, and representative devices, shown and described herein. Accordingly, various modifications ma be made without departing from the spirit or scope of the general inventive concept as defined by the appended claims and their equivalents.

What is claimed is:

1. A display device comprising:
   a display screen; and
   an optical film formed on said display screen to prevent an external light reflection, said optical film being a porous thin film comprising fine magnesium fluoride particles and a binder containing as a main component at least one material selected from the group consisting of:
   a condensate of a silane compound having a fluoroalkyl group;
   a co-condensate of said silane compound and silicon; and
   a co-condensate of said silane compound and a metal oxide series compound, said binder being added in an amount of 0.25 to 11 parts by weight relative to 1 part by weight of said fine magnesium fluoride particles.

2. The display device according to claim 1, wherein said display device is a cathode ray tube.

3. The display device according to claim 1, wherein said display device is a liquid crystal display device.

4. The display device according to claim 1, wherein said porous thin film has a porosity of 4.5 to 36%.

5. The display device according to claim 1, wherein said fine magnesium fluoride particles have a particle diameter of 10A to 1000A.

6. The display device according to claim 1, wherein said metal oxide is selected from the group consisting of titanium alkoxide and zirconium alkoxide.

7. The display device according to claim 1, wherein said porous thin film further contains at least one kind of an electrically conductive fine particles selected from the group consisting of indium oxide and tin oxide.

8. The display device according to claim 1, wherein said silane compound having a fluoroalkyl group is at least one compound selected from the group consisting of:

$CF_3(CF_2)_5(CH_2)_2Si(OR)_3$;

$CF_3(CF_2)_5(CH_2)_2Si(OR)_2$
           $|$
           $CH_3$ $CF_3(CH_2)_2Si(OR)_3$;
$(OR)_3Si(CH_2)_2(CF_2)_5(CH_2)_2Si(OR)_3$;
$CF_3(CF_2)_7(CH_2)_2Si(OR)_3$;
$CF_3(CH_2)_2SiCl_3$;
$Cl_3Si(CH_2)_2(CF_2)_5(CH_2)_2SiCl_3$;
$CF_3(CF_2)_7(CH_2)_2SiCl_3$;
$CF_3(CF_2)_7(CH_2)_2Si(CH_3)(OR)_2$;
$CF_3(CF_2)_5(CH_2)_2SiCl_3$;

$CF_3(CH_2)_2Si(OR)_2$
           $|$
           $CH_3$ $CF_3(CH_2)_2SiCl_2$; and
           $|$
           $CH_3$ $CF_3(CF_2)_7(CH_2)_2Si(CH_3)Cl_2$;
(R: alkyl group, phenyl group).

9. A display device comprising:
   a display screen; and
   an optical film formed on said display screen to prevent an external light reflection, said optical film being a porous thin film comprising fine magnesium fluoride particles and a binder containing as a main component at least one material selected from the group consisting of:
   a condensate of a silane compound having a fluoroalkyl group; and
   a co-condensate of said silane compound and silicon oxide, said binder being added in an amount of 0.25 to 11 parts by weight relative to 1 part by weight of said fine magnesium fluoride particles.

10. The display device according to claim 9, wherein said display device is a cathode ray tube.

11. The display device according to claim 9, wherein said display device is a liquid crystal display device.

12. The display device according to claim 9, wherein said porous thin film has a porosity of 4.5 to 36%.

13. The display device according to claim 9, wherein said fine magnesium fluoride particles have a particular diameter of 10A to 1000A.

14. The display device according to claim 9, wherein said silane compound having a fluoroalkyl group is at least one compound selected from the group consisting of:

$CF_3(CF_2)_5(CH_2)_2Si(OR)_3$;

$CF_3(CF_2)_5(CH_2)_2Si(OR)_2$
           $|$
           $CH_3$ $CF_3(CH_2)_2Si(OR)_3$;
$(OR)_3Si(CH_2)_2(CF_2)_5(CH_2)_2Si(OR)_3$;
$CF_3(CF_2)_7(CH_2)_2Si(OR)_3$;
$CF_3(CH_2)_2SiCl_3$;
$Cl_3Si(CH_2)_2(CF_2)_5(CH_2)_2SiCl_3$;
$CF_3(CF_2)_7(CH_2)_2SiCl_3$;
$CF_3(CF_2)_7(CH_2)_2Si(CH_3)(OR)_2$;
$CF_3(CF_2)_5(CH_2)_2SiCl_3$;

$CF_3(CH_2)_2Si(OR)_2$
           $|$
           $CH_3$ $CF_3(CH_2)_2SiCl_2$; and
           $|$
           $CH_3$ $CF_3(CF_2)_7(CH_2)_2Si(CH_3)Cl_2$;
(R: alkyl group, phenyl group).

* * * * *